United States Patent
Drees et al.

(10) Patent No.: US 11,566,805 B2
(45) Date of Patent: Jan. 31, 2023

(54) INTEGRATED SMART ACTUATOR AND VALVE DEVICE APPLICATIONS

(71) Applicant: Johnson Controls Technology Company, Auburn Hills, MI (US)

(72) Inventors: Kirk H. Drees, Cedarburg, WI (US); Herbert J. Doll, Whitefish Bay, WI (US); Gerald A. Duenkel, Grafton, WI (US); Marcello Passoni, Vimercate (IT); Abu Bakr Khan, Franklin, WI (US); Kevin A. Weiss, Gurnee, IL (US); Christopher Merkl, Milwaukee, WI (US); Gary A. Romanowich, Slinger, WI (US); Joseph F. Mann, Plymouth, MI (US); Hunter Hobgood, Plymouth, MI (US); Dinesh Trikha, Shorewood, WI (US); Rick A. Van Buren, Fort Worth, TX (US); Nicholas P. Prato, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 15/901,852

(22) Filed: Feb. 21, 2018

(65) Prior Publication Data
US 2018/0238577 A1    Aug. 23, 2018

Related U.S. Application Data

(60) Provisional application No. 62/462,308, filed on Feb. 22, 2017.

(51) Int. Cl.
*G05B 21/00* (2006.01)
*G01M 1/38* (2006.01)
(Continued)

(52) U.S. Cl.
CPC ............ *F24F 11/38* (2018.01); *F24F 11/49* (2018.01); *F24F 11/58* (2018.01); *F24F 11/64* (2018.01);
(Continued)

(58) Field of Classification Search
CPC .. F24F 11/38; F24F 11/49; F24F 11/58; F24F 11/64; F24F 11/65; F24F 11/70;
(Continued)

(56) References Cited

U.S. PATENT DOCUMENTS

| 5,207,379 A | 5/1993 | Hurmi et al. |
| 5,289,867 A | 3/1994 | Barker et al. |

(Continued)

FOREIGN PATENT DOCUMENTS

| CN | 104685279 A | 6/2015 |
| WO | WO-2016/179045 A1 | 11/2016 |

OTHER PUBLICATIONS

U.S. Notice of Allowance on U.S. Appl. No. 15/399,706 dated May 26, 2017 (8 pages).
(Continued)

*Primary Examiner* — Zhipeng Wang
(74) *Attorney, Agent, or Firm* — Foley & Lardner LLP

(57) ABSTRACT

An integrated device in an HVAC system is configured to modify an environmental condition of a building. The integrated device includes a valve configured to regulate a flow of a fluid through a conduit and an actuator. The actuator includes a motor and a drive device. The drive device is driven by the motor and coupled to the valve for driving the valve between multiple positions. The integrated device further includes a processing circuit coupled to the motor. The processing circuit is configured to detect device identifying information for the valve or the actuator and to detect the integrated device location within the building.

21 Claims, 14 Drawing Sheets

(51) Int. Cl.
  *G05B 13/00* (2006.01)
  *G05B 15/00* (2006.01)
  *G05D 23/00* (2006.01)
  *F24F 11/38* (2018.01)
  *F24F 11/49* (2018.01)
  *F24F 11/64* (2018.01)
  *F24F 11/65* (2018.01)
  *F24F 11/70* (2018.01)
  *F24F 11/84* (2018.01)
  *G05B 15/02* (2006.01)
  *F24F 11/58* (2018.01)
  *F24F 140/00* (2018.01)
  *F24F 110/10* (2018.01)

(52) U.S. Cl.
  CPC .............. *F24F 11/65* (2018.01); *F24F 11/70* (2018.01); *F24F 11/84* (2018.01); *G05B 15/02* (2013.01); *F24F 2110/10* (2018.01); *F24F 2140/00* (2018.01); *G05B 2219/2642* (2013.01)

(58) Field of Classification Search
  CPC .... F24F 11/84; F24F 2110/10; F24F 2140/00; G05B 15/02; G05B 2219/2642; G05B 19/042; G05B 2219/2614
  See application file for complete search history.

(56) References Cited

U.S. PATENT DOCUMENTS

| | | | |
|---|---|---|---|
| 6,253,748 | B1 | 7/2001 | Engel et al. |
| 6,296,193 | B1 | 10/2001 | West et al. |
| 6,352,106 | B1 | 3/2002 | Hartman |
| 8,428,755 | B2 | 4/2013 | Salsbury |
| 8,825,185 | B2 | 9/2014 | Salsbury |
| 9,746,199 | B1 | 8/2017 | Drees et al. |
| 9,805,588 | B2* | 10/2017 | Gritzo .................... G08B 25/14 |
| 9,835,347 | B2 | 12/2017 | Asmus et al. |
| 10,317,101 | B2 | 6/2019 | Trikha et al. |
| 2008/0148840 | A1 | 6/2008 | Zimmermann et al. |
| 2008/0296346 | A1 | 12/2008 | Shelton et al. |
| 2010/0141602 | A1* | 6/2010 | Duchene ............. G05B 19/042 345/173 |
| 2011/0205055 | A1* | 8/2011 | Smaidris ............. F16K 37/0091 340/539.1 |
| 2012/0170639 | A1 | 7/2012 | Salsbury |
| 2013/0029580 | A1 | 1/2013 | Furrer et al. |
| 2014/0067135 | A1* | 3/2014 | Lehnert .................... F24F 11/30 700/276 |
| 2014/0277764 | A1* | 9/2014 | Burt ........................ F24F 11/30 700/276 |
| 2015/0045962 | A1 | 2/2015 | Wenzel et al. |
| 2015/0176931 | A1 | 6/2015 | Aeberhard et al. |
| 2015/0323200 | A1 | 11/2015 | Gluck et al. |
| 2016/0161139 | A1 | 6/2016 | Asmus et al. |
| 2016/0187368 | A1 | 6/2016 | Modi et al. |
| 2016/0291606 | A1* | 10/2016 | Someya ................ F24F 5/0003 |
| 2016/0308473 | A1 | 10/2016 | Alexander et al. |
| 2016/0327295 | A1 | 11/2016 | Ward et al. |
| 2017/0003150 | A1 | 1/2017 | Noboa et al. |
| 2017/0295058 | A1 | 10/2017 | Gottschalk et al. |
| 2018/0046164 | A1 | 2/2018 | Drees |
| 2019/0085871 | A1* | 3/2019 | Berner ................ F15B 13/0871 |
| 2019/0353385 | A1 | 11/2019 | Aucoin et al. |

OTHER PUBLICATIONS

U.S. Appl. No. 15/207,431, filed Jul. 11, 2016, Johnson Controls Technology Company.
U.S. Appl. No. 15/232,800, filed Aug. 9, 2016, Johnson Controls Technology Company.
U.S. Appl. No. 15/336,749, filed Oct. 27, 2016, Johnson Controls Technology Company.
International Search Report and Written Opinion on International Patent Application No. PCT/US2018/012376 dated May 7, 2018. 14 pages.
Extended European Search Report on EP 18735848.6 dated Dec. 3, 2019. 12 pages.
Office Action on EP 18735848.6, dated Aug. 6, 2020, 5 pages.
Second Office Action for Chinese Application No. CN 201880005987.2 dated Dec. 23, 2020, 6 pages.
Office Action on CN 201880005987.2, dated Jul. 5, 2021, 11 pages with English language translation.
EP Office Action on EP Appl. Ser. No. 18735848.6 dated Oct. 19, 2021 (4 pages).
EP Office Action on EP Appl. Ser. No. 18735848.6 dated May 31, 2022 (6 pages).

* cited by examiner

INTEGRATED SMART ACTUATOR AND VALVE DEVICE APPLICATIONS

CROSS REFERENCE TO RELATED APPLICATIONS

The present application claims the benefit of U.S. Provisional Application No. 62/462,308, filed Feb. 22, 2017, which is incorporated herein by reference in its entirety.

BACKGROUND

The present disclosure relates generally to building management systems and associated devices and more particularly to an integrated valve and actuator HVAC device with wireless communications and control capabilities.

HVAC actuators are used to operate a wide variety of HVAC components such as air dampers, fluid valves, air handling units, and other components that are typically used in HVAC systems. For example, an actuator can be coupled to a damper, valve, or other movable equipment in a HVAC system and can be used to drive the equipment between an open position and a closed position. An actuator typically includes a motor and a drive device (e.g., a hub, a drive train, etc.) that is driven by the motor and coupled to the HVAC component.

However, many existing HVAC actuators are largely mechanical devices that fail to take advantage of recent advances in processing and wireless communications technology. In particular, current HVAC actuators have failed to capitalize on improvements to embedded microprocessors for circuit boards. These improvements have resulted in control and wireless communications capabilities that may be packaged in form factors small enough to fit within existing actuator housings. It would be advantageous to increase the functionality of HVAC actuator devices. At the same time, it would be advantageous to decrease the overall number of devices a technician must install and maintain in an HVAC system.

SUMMARY

One implementation of the present disclosure is an integrated device in an HVAC system configured to modify an environmental condition of a building. The integrated device includes a valve configured to regulate a flow of a fluid through a conduit and an actuator. The actuator includes a motor and a drive device. The drive device is driven by the motor and coupled to the valve for driving the valve between multiple positions. The integrated device further includes a processing circuit coupled to the motor. The processing circuit is configured to detect device identifying information for the valve or the actuator and to detect the integrated device location within the building.

In some embodiments, the integrated device further includes a communications mechanism coupled to the processing circuit. In other embodiments, the communications mechanism is configured to transmit the integrated device location to an external device. In still other embodiments, the external device is at least one of a supervisory controller and a mobile device.

In some embodiments, device identifying information includes a flow requirement. In other embodiments, device identifying information includes a stroke length. In still other embodiments, device identifying information includes a performance profile.

Another implementation of the present disclosure is an integrated device in an HVAC system configured to modify an environmental condition of a building. The integrated device includes a valve configured to regulate a flow of a fluid through a conduit, a flow sensor configured to measure a flow rate of the fluid through the conduit, and an actuator. The actuator includes a motor and a drive device. The drive device is driven by the motor and coupled to the valve for driving the valve between multiple positions. The integrated device further includes a processing circuit coupled to the motor and the flow sensor. The processing circuit is configured to detect a fault condition based on a measurement from the flow sensor and to perform a fault resolution action in response to detection of the fault condition. The actuator and the processing circuit are located within a common integrated device chassis.

In some embodiments, the integrated device includes a communications mechanism coupled to the processing circuit. In other embodiments, the integrated device is configured to receive a flow rate setpoint from an external control device. The processing circuit is further configured to detect the fault condition based on the flow rate setpoint.

In some embodiments, the fault resolution action includes logging a fault condition.

In some embodiments, the flow sensor is a heated thermistor flow sensor. In other embodiments, the heated thermistor flow sensor is configured to measure a temperature of the fluid through the conduit. In still other embodiments, the fault condition includes the temperature measurement of the fluid through the conduit exceeding a temperature threshold.

In some embodiments, the fault condition includes the flow measurement of fluid through the conduit exceeding a flow rate threshold. In other embodiments, the fault resolution action includes transmitting a signal to the motor to drive the drive device a full stroke length between a first end stop location and a second end stop location.

Still another implementation of the present disclosure is an integrated device in an HVAC system configured to modify an environmental condition of a building. The integrated device includes a valve configured to regulate a flow of a fluid through a conduit and an actuator. The actuator includes a motor and a drive device. The drive device is driven by the motor and coupled to the valve for driving the valve between multiple positions. The integrated device further includes a communications mechanism configured to receive an automatic valve balancing application from an external device and a processing circuit coupled to the motor and the communications mechanism. The processing circuit is configured to execute the automatic valve balancing program. The actuator, the communications mechanism, and the processing circuit are located within a common integrated device chassis.

In some embodiments, the external device is a mobile device.

In some embodiments, the integrated device includes a flow sensor configured to measure a flow rate of the fluid through the conduit. In other embodiments, the flow sensor is located within the common integrated device chassis.

DETAILED DESCRIPTION

Overview

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, various integrated valve and actuator HVAC devices with wireless communication capabilities are shown, according to some embodiments. The integrated device may combine the functionality of an actuator, a valve, a controller and a wireless communications mechanism into a single package. The wireless communications mechanism permits multiple integrated devices in a system to communicate with each other. An electronic flow rate sensor that measures the flow rate or velocity of fluid flowing through the valve may, alternatively, be integrated within the valve or provided as a separate component.

The integrated valve and actuator device may be utilized within a cascaded control system. In a cascaded control system, a primary controller generates a control signal that serves as the setpoint for a secondary controller (e.g., the controller within the integrated device). Thus, a cascaded control system contains an outer control loop and an inner control loop. For example, the outer loop (primary) controller may determine a flow rate setpoint for the inner loop based on the measured temperature of a building zone. In response, the inner loop (secondary) controller may utilize flow rate sensor measurements to determine the necessary actuator position setpoint to achieve the flow rate setpoint received from the outer loop. System pressure disturbances may be automatically attenuated by the feedback control action of the inner loop.

The smart actuator device may be suitable for a variety of other applications that represent improvements over existing actuator devices. These applications may include device identification and recognition, fault detection, and troubleshooting functions. In addition, smart actuator devices may be used to perform automatic valve balancing and fire damper checkout tasks.

Building Management System and HVAC System

Figure 1:
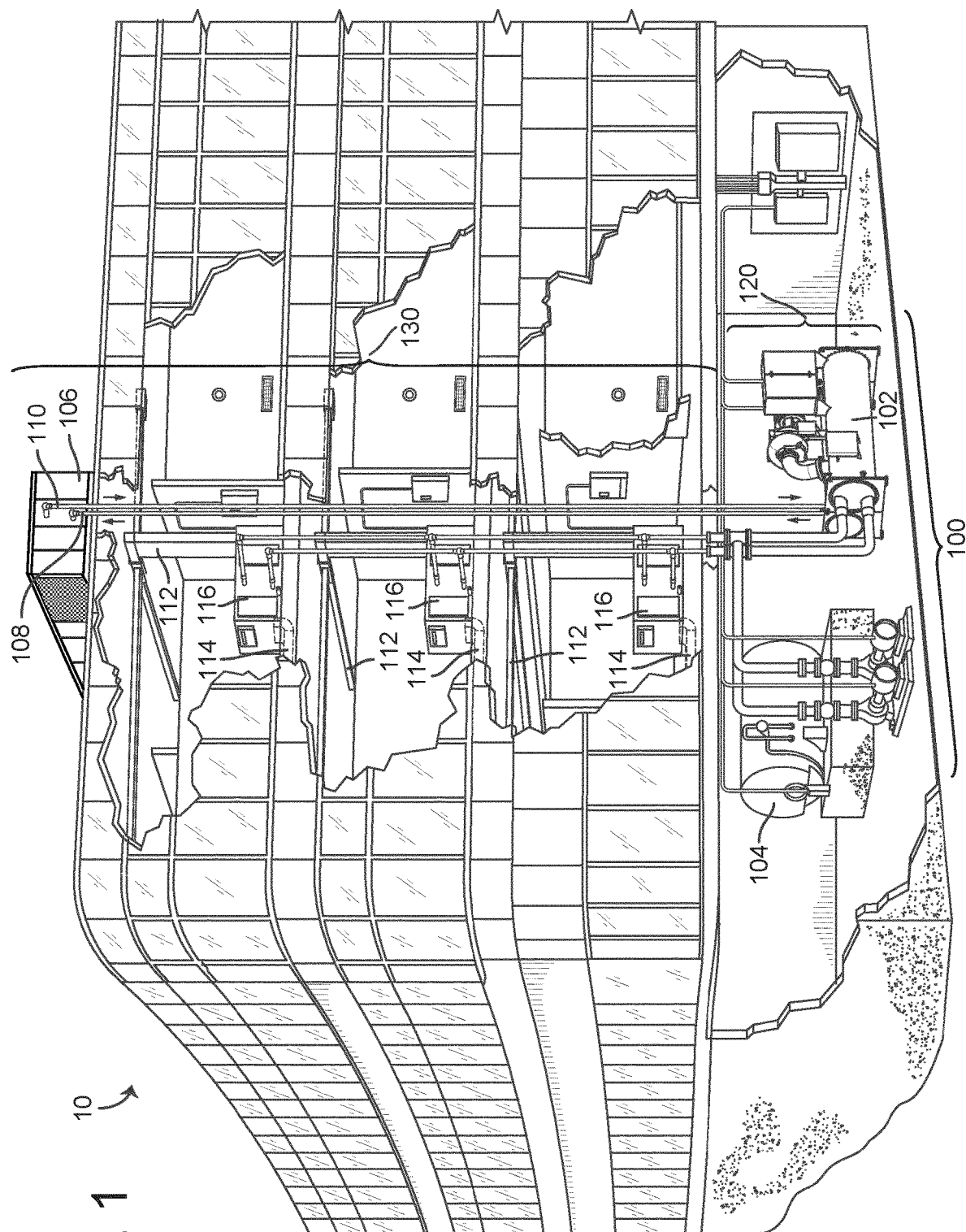
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
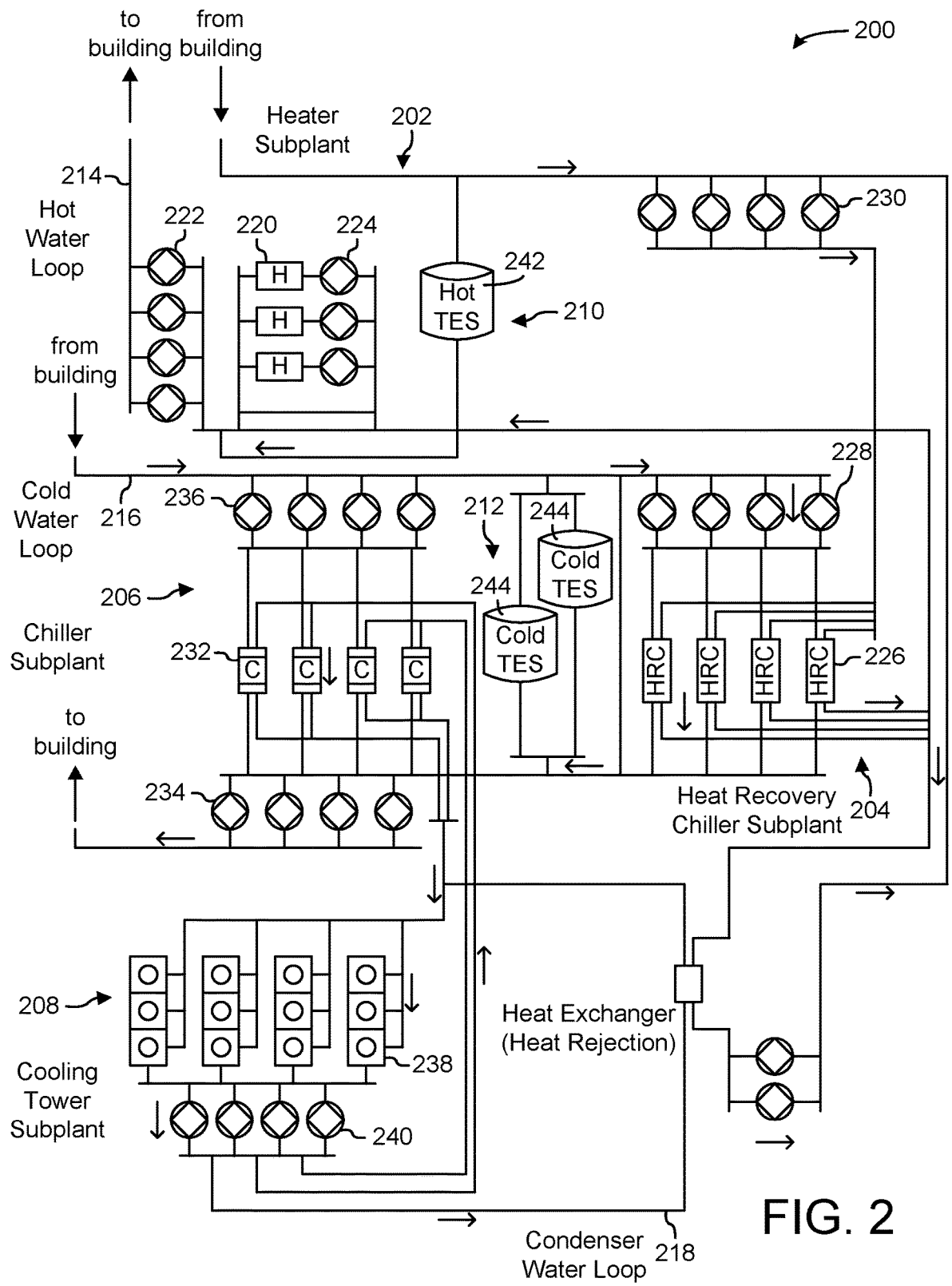
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
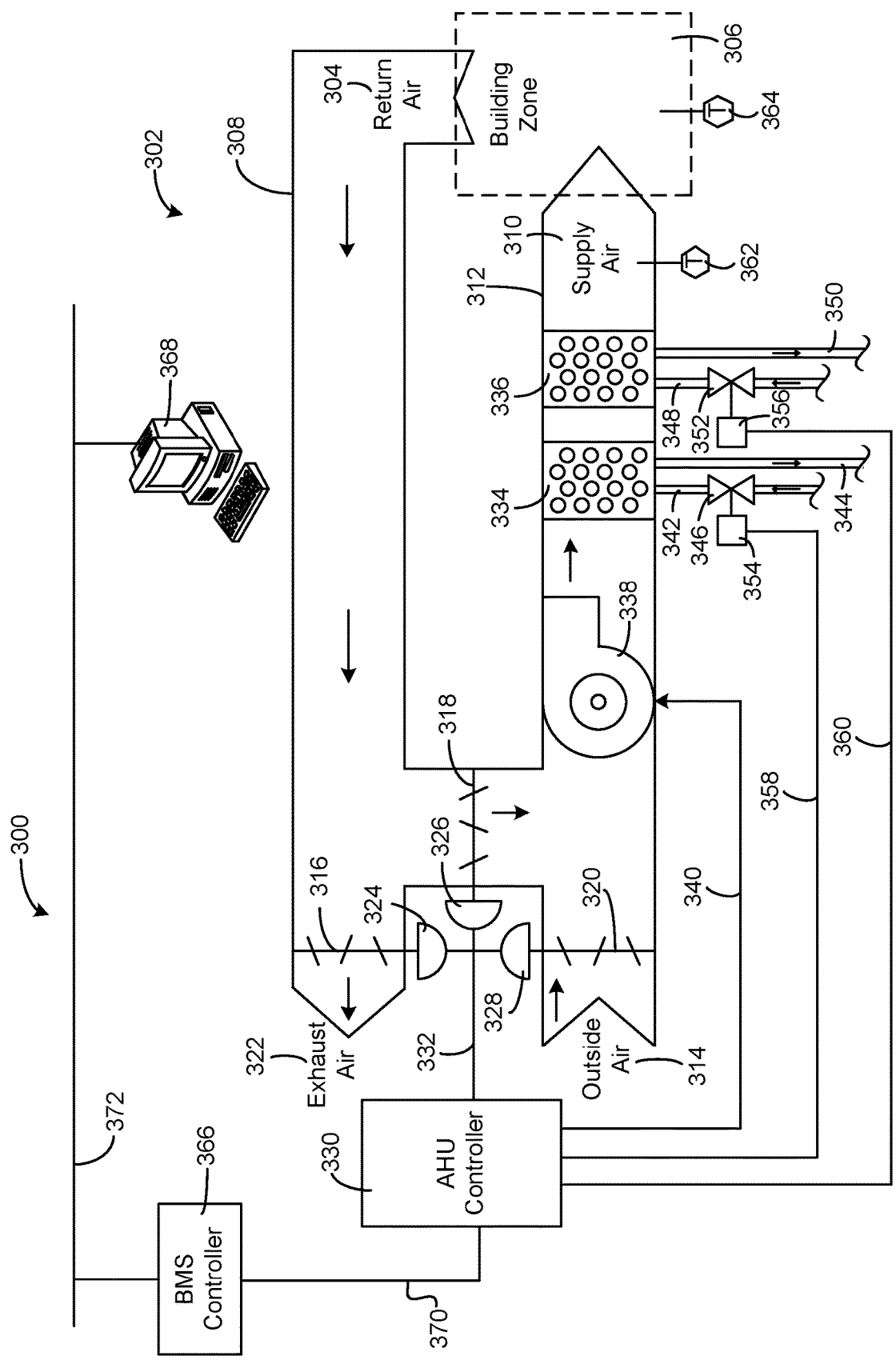
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
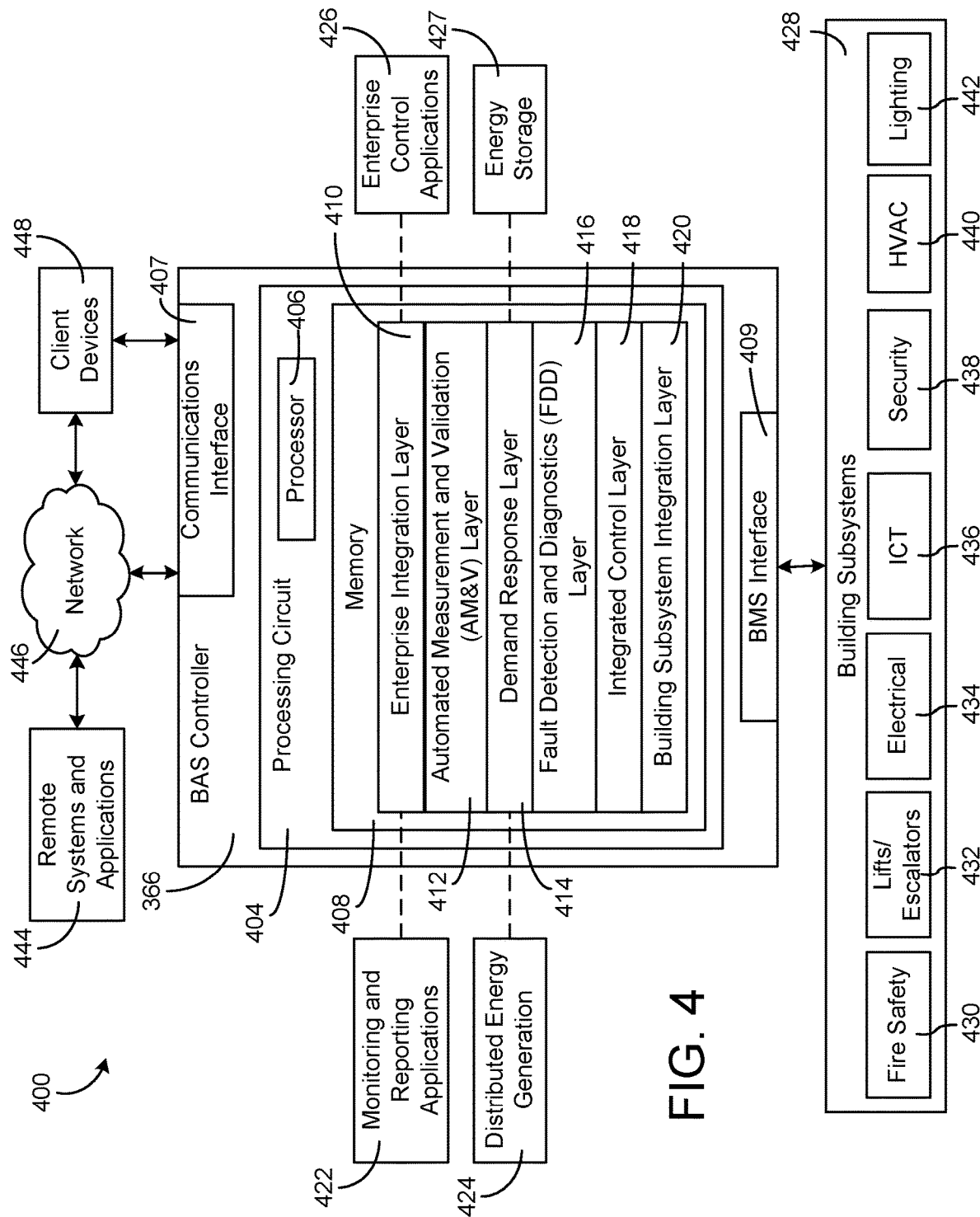
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels.

For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Smart Actuator Valve Device

Figure 5:
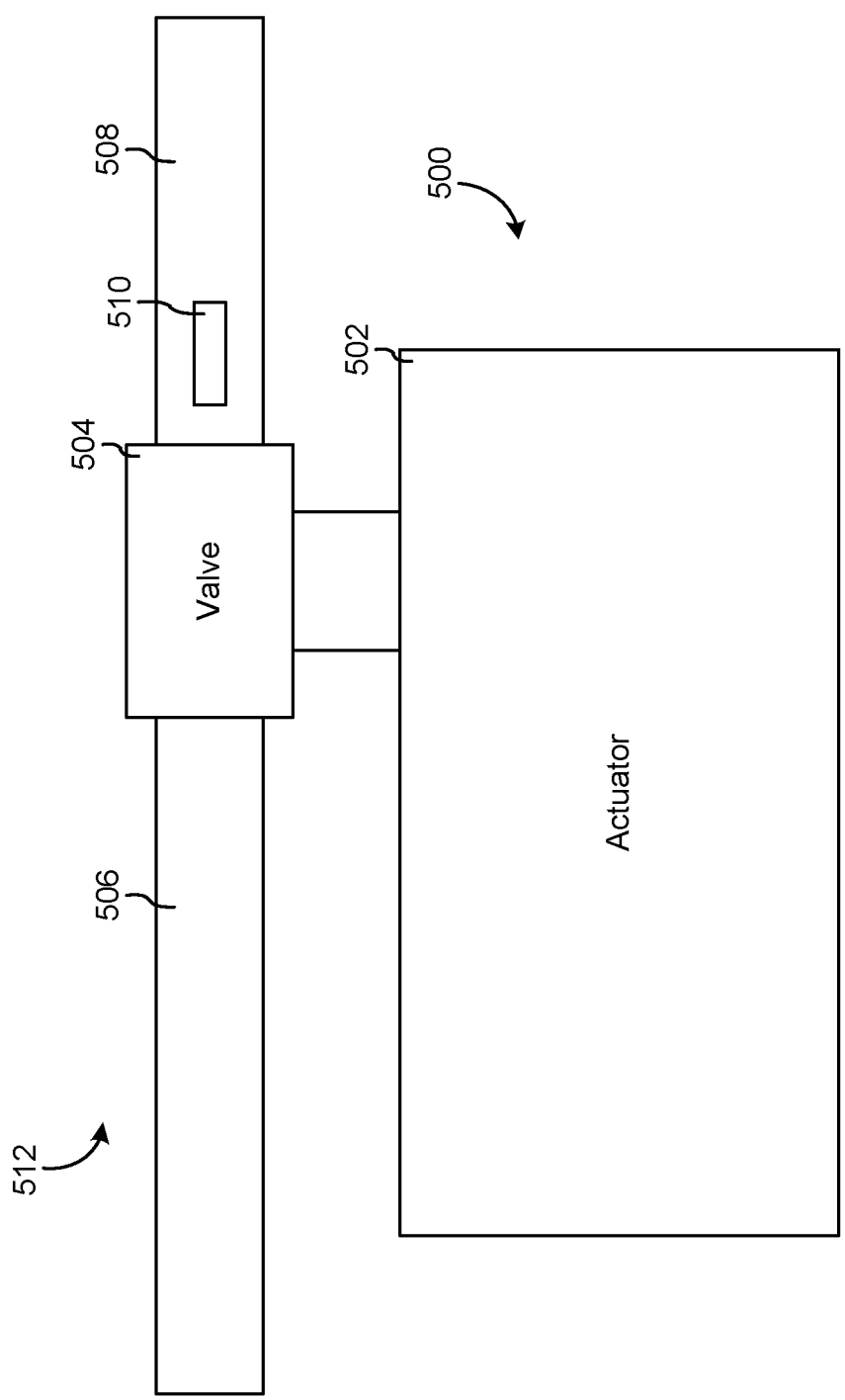
FIG. 5 is a block diagram of an integrated smart actuator and valve device that can be implemented in the HVAC system of FIG. 1, according to some embodiments.

Referring now to FIG. 5, a block diagram of a smart actuator valve device 500 is shown, according to some embodiments. Device 500 may be used in HVAC system 100, waterside system 200, airside system 300, or BMS 400, as described with reference to FIGS. 1-4. Smart actuator valve device 500 is shown to include an actuator 502 coupled to a valve 504. For example, actuator 502 may be a damper actuator, a valve actuator, a fan actuator, a pump actuator, or any other type of actuator that can be used in an HVAC system or BMS. In various embodiments, actuator 500 may be a linear actuator (e.g., a linear proportional actuator), a non-linear actuator, a spring return actuator, or a non-spring return actuator.

Valve 504 may be any type of control device configured to control an environmental parameter in an HVAC system, including a 2-way or 3-way two position electric motorized valve, a ball isolation valve, a floating point control valve, an adjustable flow control device, or a modulating control valve. In some embodiments, valve 504 may regulate the flow of fluid through a conduit, pipe, or tube (e.g., conduit 512) in a waterside system (e.g., waterside system 200, shown in FIG. 2). Conduit 512 may include upstream conduit section 506 and downstream conduit section 508. In other embodiments, valve 504 may regulate the flow of air through a duct in an airside system (e.g., airside system 300, shown in FIG. 3).

In some embodiments, actuator 502 and valve 504 are located within a common integrated device chassis or housing. In short, actuator 502 and valve 504 may not be packaged as separate devices, but as a single device. Reducing the number of devices in an HVAC system may provide numerous advantages, most notably in time and cost savings during the installation process. Because it is not necessary to install actuator 502 and valve 504 as separate devices and then make a connection between them, technicians performing the installation may require less specialized training and fewer tools. Other advantages of a single device may include simplification of control and troubleshooting functions. However, in some embodiments, actuator 502 and valve 504 are packaged as separate devices that may be communicably coupled via a wired or a wireless connection.

Still referring to FIG. 5, flow sensor 510 is shown to be disposed within downstream conduit section 508. Flow sensor 510 may be configured to measure the flow rate or velocity of fluid passing through conduit 512, and more specifically, the flow rate of fluid exiting valve 504. Flow sensor 510 may be any type of device (e.g., ultrasonic detector, paddle-wheel sensor, pilot tube, drag-force flowmeter) configured to measure the flow rate or velocity using any applicable flow sensing method. In some embodiments, flow sensor 510 is a heated thermistor flow sensor that operates according to the principles of King's Law. According to King's Law, the heat transfer from a heated object exposed to a moving fluid is a function of the velocity of the fluid. King's Law devices have several features, including very high sensitivity at low flow rates and measurement of the fluid temperature (which may be useful for fault detection and control purposes), although they have decreased sensitivity at high flow rates.

In other embodiments, flow sensor 510 is a vortex-shedding flowmeter configured to determine the fluid flow rate by calculating the Strouhal number. The Strouhal number is a dimensionless value useful for characterizing oscillating flow dynamics. A vortex-shedding flowmeter measures the flow rate via acoustic detection of vortices in fluid caused when the fluid flows past a cylindrically-shaped obstruction. The vibrating frequency of the vortex shedding is correlated to the flow velocity. Vortex-shedding flowmeters have good sensitivity over a range of flow rates, although they require a minimum flow rate in order to be operational.

In some embodiments, flow sensor 510 is communicably coupled to smart actuator valve device 500. For example, flow sensor 510 may be coupled via wired or wireless connection to a controller of device 500 for the purpose of transmission of flow rate data signals. In various embodiments, flow rate data signals may be used by the controller of device 500 to determine control operations for actuator 502 and/or valve 504. In further embodiments, flow sensor 510 is disposed within valve 504 to measure the rate of fluid flow before the fluid exits valve 504. When flow sensor 510 is located within valve 504, flow sensor 510 may additionally function as a fault detection mechanism for smart actuator valve device 500. For example, when debris becomes lodged in actuator 502 or valve 504, flow through valve 504 may be significantly reduced. This reduction in flow may occur because the components of actuator 502 cannot freely operate valve 504, or because the debris within valve 504 obstructs flow through conduit 512. As another example, if flow sensor 510 is configured to measure the temperature of the fluid (e.g., because sensor 510 is a heated thermistor flow sensor, described in greater detail with reference to FIG. 6 below) and actuator 502 experiences a failure causing the device to overheat, a controller within device 500 may be able to detect the failure based on temperature data received from flow sensor 510.

Figure 6:
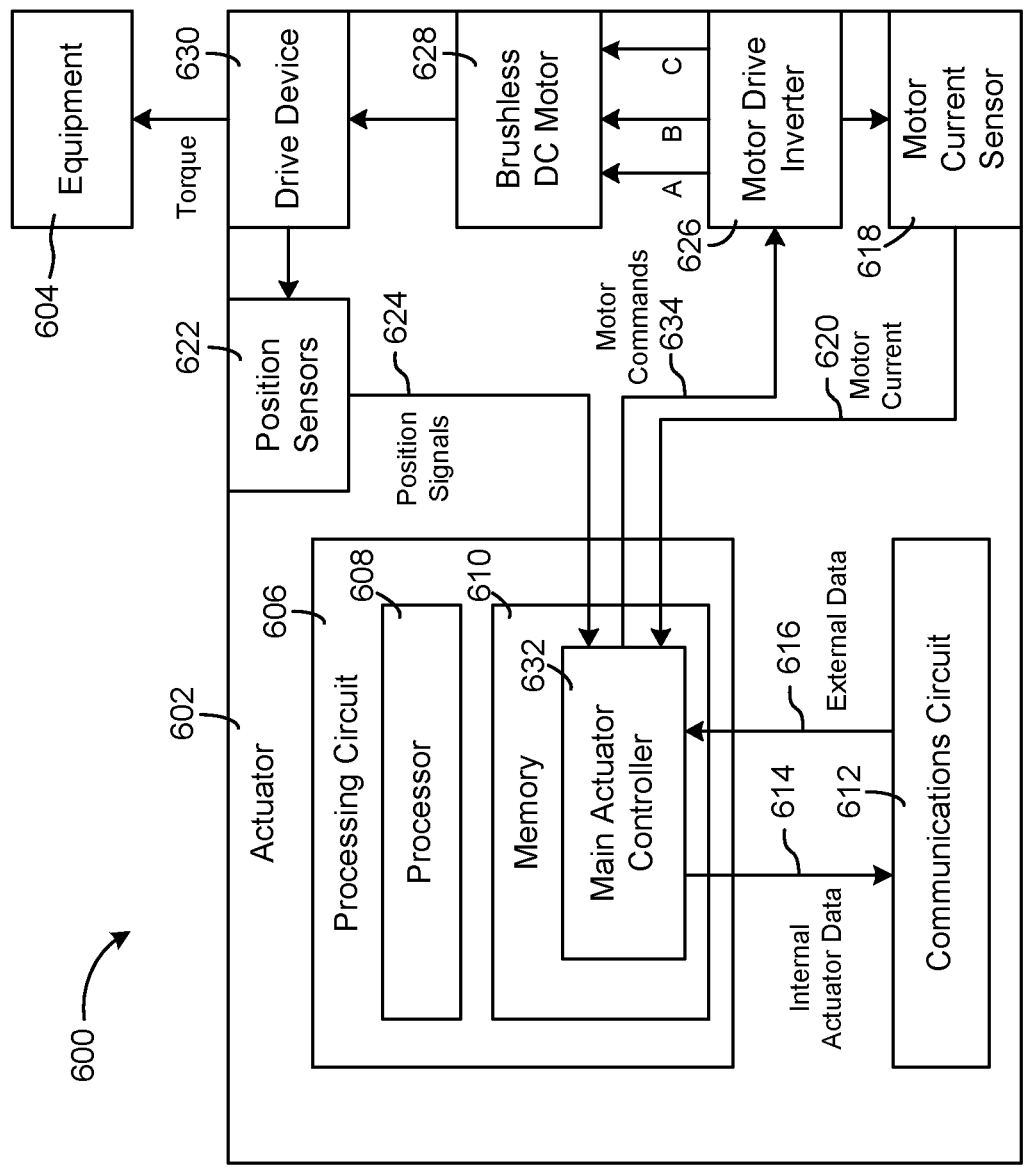
FIG. 6 is a block diagram of another integrated smart actuator and valve device that can be implemented in the HVAC system of FIG. 1, according to some embodiments.

Turning now to FIG. 6, a block diagram of another smart actuator valve device 600 is shown, according to some embodiments. Smart actuator valve device 600 may be used in HVAC system 100, waterside system 200, airside system 300, or BMS 400, as described with reference to FIGS. 1-4. Device 600 may represent a more detailed version of device 500. For example, smart actuator valve device 600 is shown to include actuator 602, which may be identical or substantially similar to actuator 502 in device 500. Actuator 602 may be configured to operate equipment 604. Equipment 604 may include any type of system or device that can be operated by an actuator (e.g., a valve, a damper). In an exemplary embodiment, actuator 602 and equipment 604 (e.g., a valve) are packaged within a common integrated device chassis.

Actuator 602 is shown to include a processing circuit 606 communicably coupled to brushless DC (BLDC) motor 628. Processing circuit 606 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 606 and may include computer code for executing (e.g., by processor 608) one or more processes described herein. When processor 608 executes instructions stored in memory 610, processor 608 generally configures actuator 602 (and more particularly processing circuit 606) to complete such activities.

Main actuator controller 632 may be configured to receive external control data 616 (e.g., position setpoints, speed setpoints, etc.) from communications circuit 612 and position signals 624 from position sensors 622. Main actuator controller 632 may be configured to determine the position of BLDC motor 628 and/or drive device 630 based on position signals 624. In some embodiments, main actuator controller 632 receives data from additional sources. For example, motor current sensor 618 may be configured to measure the electric current provided to BLDC motor 628. Motor current sensor 618 may generate a feedback signal indicating the motor current 620 and may provide this signal to main actuator controller 632 within processing circuit 608.

Still referring to FIG. 6, processing circuit 608 may be configured to output a pulse width modulated (PWM) DC motor command 634 to control the speed of the BLDC motor. BLDC motor 628 may be configured to receive a three-phase PWM voltage output (e.g., phase A, phase B, phase C) from motor drive inverter 626. The duty cycle of the PWM voltage output may define the rotational speed of BLDC motor 628 and may be determined by processing circuit 606 (e.g., a microcontroller). Processing circuit 606 may increase the duty cycle of the PWM voltage output to increase the speed of BLDC motor 628 and may decrease the duty cycle of the PWM voltage output to decrease the speed of BLDC motor 628.

BLDC motor 628 may be coupled to drive device 630. Drive device 630 may be a drive mechanism, a hub, or other device configured to drive or effectuate movement of a HVAC system component (e.g., equipment 604). For example, drive device may be configured to receive a shaft of a damper, a valve, or any other movable HVAC system component in order to drive (e.g., rotate) the shaft. In some embodiments, actuator 602 includes a coupling device configured to aid in coupling drive device 630 to the movable HVAC system component. For example, the coupling device may facilitate attaching drive device 630 to a valve or damper shaft.

Position sensors 622 may include Hall effect sensors, potentiometers, optical sensors, or other types of sensors configured to measure the rotational position of BLDC motor 628 and/or drive device 630. Position sensors 622 may provide position signals 624 to processing circuit 606. Main actuator controller 632 may use position signals 624 to determine whether to operate BLDC motor 628. For example, main actuator controller 632 may compare the current position of drive device 630 with a position setpoint received via external data input 616 and may operate BLDC motor 628 to achieve the position setpoint.

Actuator 602 is further shown to include a communications circuit 612. Communications circuit 612 may be a wired or wireless communications link and may use any of a variety of disparate communications protocols (e.g., BACnet, LON, WiFi, Bluetooth, NFC, TCP/IP, etc.). In some embodiments, communications circuit 612 is an integrated circuit, chip, or microcontroller unit (MCU) configured to bridge communications actuator 602 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using a master/slave token passing (MSTP) protocol. Communications circuit 612 can be added to any existing product to enable BACnet communication with minimal software and hardware design effort. In other words, communications circuit 612 provides a BACnet interface for smart actuator valve device 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within actuator 602. In some embodiments, communications circuit 612 may receive internal actuator data 614 from main actuator controller 632. For example, internal actuator data 614 may include the sensed motor current 620, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 602. In some embodiments, communications circuit 612 may transmit external data 616 to main actuator controller 632. External data 616 may include, for example, position setpoints, speed setpoints, control signals, configuration parameters, end stop locations, stroke length parameters, commissioning data, equipment model data, actuator firmware, actuator software, or any other type of data which can be used by actuator 602 to operate BLDC motor 628 and/or drive device 630.

In some embodiments, external data 616 is a DC voltage control signal. Actuator 602 can be a linear proportional actuator configured to control the position of drive device 630 according to the value of the DC voltage received. For example, a minimum input voltage (e.g., 0.0 VDC) may correspond to a minimum rotational position of drive device 630 (e.g., 0 degrees, −5 degrees, etc.), whereas a maximum input voltage (e.g., 10.0 VDC) may correspond to a maximum rotational position of drive device 630 (e.g., 90 degrees, 95 degrees, etc.). Input voltages between the minimum and maximum input voltages may cause actuator 602 to move drive device 630 into an intermediate position between the minimum rotational position and the maximum rotational position. In other embodiments, actuator 602 can be a non-linear actuator or may use different input voltage ranges or a different type of input control signal (e.g., AC voltage or current) to control the position and/or rotational speed of drive device 630.

In some embodiments, external data 616 is an AC voltage control signal. Communications circuit 612 may be configured to transmit an AC voltage signal having a standard power line voltage (e.g., 120 VAC or 230 VAC at 50/60 Hz). The frequency of the voltage signal can be modulated (e.g., by main actuator controller 632) to adjust the rotational position and/or speed of drive device 630. In some embodiments, actuator 602 uses the voltage signal to power various components of actuator 602. Actuator 602 may use the AC voltage signal received via communications circuit 612 as a control signal, a source of electric power, or both. In some embodiments, the voltage signal is received from a power supply line that provides actuator 602 with an AC voltage having a constant or substantially constant frequency (e.g., 120 VAC or 230 VAC at 50 Hz or 60 Hz). Communications circuit 612 may include one or more data connections (separate from the power supply line) through which actuator 602 receives control signals from a controller or another actuator (e.g., 0-10 VDC control signals).

Cascaded Control System

Figure 7:
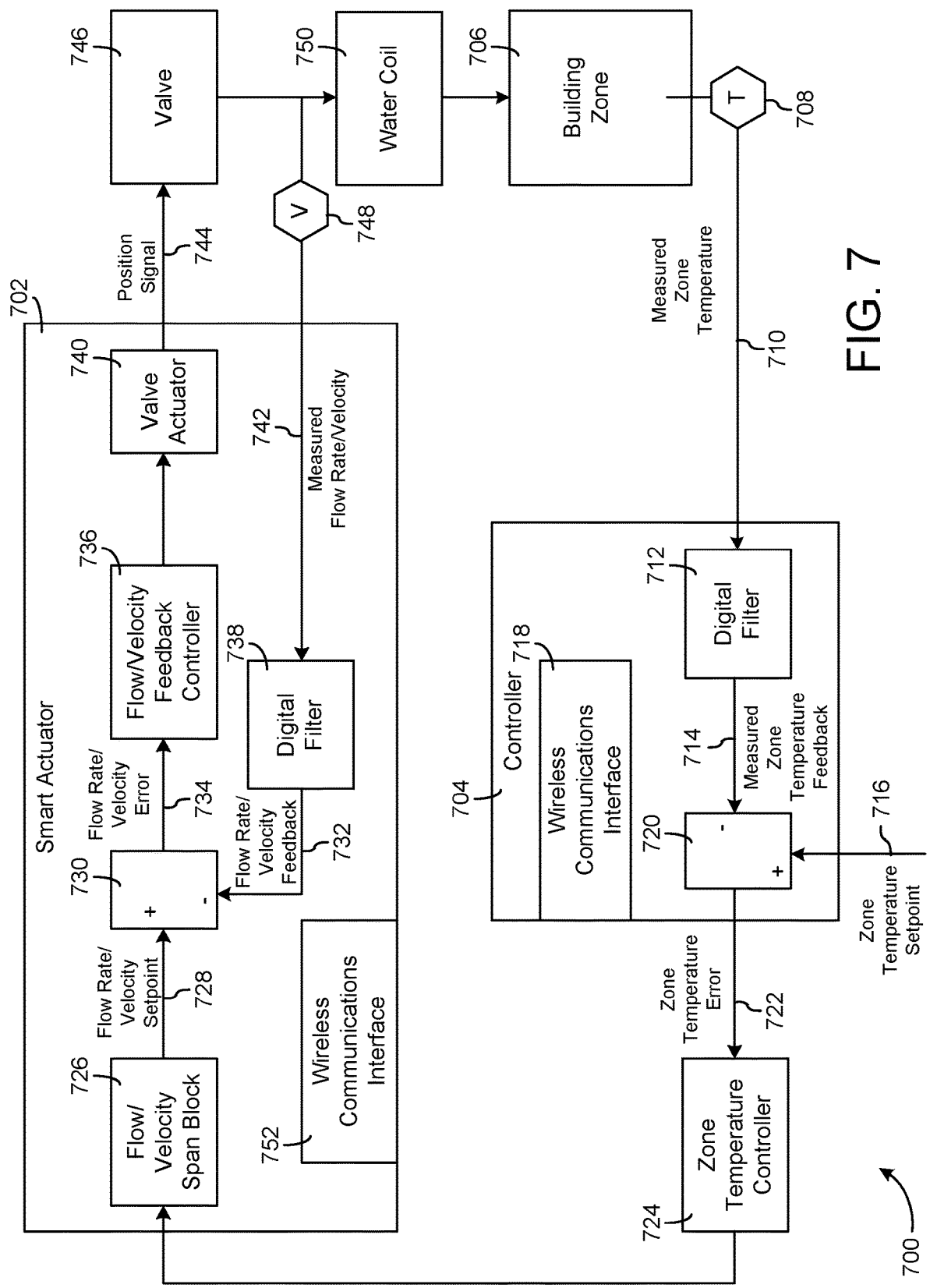
FIG. 7 is a block diagram of a smart actuator valve device within a cascaded control system that can be implemented in the HVAC system of FIG. 1, according to some embodiments.

Referring now to FIG. 7, a block diagram of a smart actuator device 702 within a cascaded control system 700 is shown, according to some embodiments. In a cascaded control system, a primary controller (e.g., controller 704) generates a control signal that serves as the setpoint for a secondary controller (e.g., flow/velocity feedback controller 736). In some embodiments, the control path including the control signal generated by the primary controller may be referred to as an "outer loop," while the control path including the secondary controller may be referred to as an "inner loop." In some embodiments, cascaded control system 700 is a component or subsystem of HVAC system 100, waterside system 200, airside system 300, or BMS 400, as described with reference to FIGS. 1-4. Cascaded control system 700 may include, among other components, smart actuator device 702, controller 704, building zone 706, zone temperature controller 724, and valve 746.

In some embodiments, controller 704 is a primary controller for the components of an HVAC system (e.g., HVAC system 100) within the outer control loop of cascaded control system 700. In other embodiments, controller 704 is a thermostat or a BMS controller (e.g., for BMS 400). In still further embodiments, controller 704 is a user device configured to run a building management application (e.g., a mobile phone, a tablet, a laptop). Controller 704 may receive data from temperature sensor 708. Temperature sensor 708 may be any type of sensor or device configured to measure an environmental condition (e.g., temperature) of a building zone 706. Building zone 706 may be any subsection of a building (e.g., a room, a block of rooms, a floor).

Controller 704 is shown to include a digital filter 712, a wireless communications interface 718, and a comparator 720. Measured zone temperature data 710 from temperature sensor 708 may be received as an input signal to digital filter 712. Digital filter 712 may be configured to convert the measured zone temperature data 710 into a measured zone temperature feedback signal 714 that may be provided as an input to comparator 720. In some embodiments, digital filter 712 is a first order low pass filter. In other embodiments, digital filter 712 may be a low pass filter of a different order or a different type of filter.

Controller 704 is further shown to include wireless communications interface 718. In some embodiments, wireless communications interface 718 may communicate data from controller 704 to wireless communications interface 752 of smart actuator device 702. In other embodiments, communications interfaces 718 and 752 may communicate with other external systems or devices. Communications via interface 718 may be direct (e.g., local wireless communications) or via a communications network (e.g., a WAN, the Internet, a cellular network). For example, interfaces 718 and 752 may include a Wi-Fi transceiver for communicating via wireless communications network. In another example, one or both interfaces 718 and 752 may include cellular or mobile phone communications transceivers. In some embodiments, multiple controllers and smart actuator devices may communicate using a mesh topology. In other embodiments, communications interfaces 718 and 752 may be configured to transmit smart actuator device data (e.g., a fault status, an actuator and/or valve position) to an external network. In still further embodiments, communications interfaces 718 and 752 are connected via a wired, rather than wireless, network.

Comparator 720 may be configured to compare the measured zone temperature feedback signal 714 output from digital filter 712 with a zone temperature setpoint value 716. Comparator 720 may then output a temperature error signal 722 that is received by zone temperature controller 724. Comparator 720 may be a discrete electronics part or implemented as part of controller 704. If comparator 720 determines that the zone temperature feedback signal 714 is higher than the zone temperature setpoint value 716 (i.e., building zone 706 is hotter than the setpoint value), zone temperature controller 724 may output a control signal that causes smart actuator device 702 to modify the flow rate through water coil 750 such that cooling to building zone 706 is increased. If comparator 720 determines that the zone temperature feedback signal 714 is lower than the zone temperature setpoint value 716 (i.e., building zone 706 is cooler than the setpoint value), zone temperature controller 724 may output a control signal that causes smart actuator device 702 to modify the flow rate through water coil 750 such that heating to building zone 706 is increased.

In various embodiments, zone temperature controller 724 is a pattern recognition adaptive controller (PRAC), a model recognition adaptive controller (MRAC), or another type of tuning or adaptive feedback controller. Adaptive control is a control method in which a controller may adapt to a controlled system with associated parameters which vary, or are initially uncertain. In some embodiments, zone temperature controller 724 is similar or identical to the adaptive feedback controller described in U.S. Pat. No. 8,825,185, granted on Sep. 2, 2014, the entirety of which is herein incorporated by reference.

Still referring to FIG. 7, smart actuator device 702 is shown to include a flow/velocity span block 726, a comparator 730, a flow/velocity feedback controller 736, a digital filter 738, a valve actuator 740, and a wireless communications interface 752. Zone temperature error 722 output from comparator 720 may be transmitted to smart actuator 702 via zone temperature controller 724. Flow/velocity span block 726 may be configured to enforce allowable maximum and minimum flow range limits on the received zone temperature error 722. For example, a technician installing the components of cascaded control system 700 or an administrator of HVAC system 100 may input a maximum and/or a minimum flow range limit for the flow/velocity span block 726. In some embodiments, the flow range limits are transmitted via mobile device (e.g., a smart phone, a table) and are received via wireless communications interface 752 of smart actuator device 702. In other embodiments, the flow range limits are transmitted to interface 752 via wired network.

In other embodiments, flow limits may be calibrated on-site (e.g., by a water balancer) at the building location. For example, a water balancer may be used to manually adjust the position of valve 746 until a desired maximum and/or minimum flow rate is obtained, as measured by certified equipment. In some embodiments, these limits are subsequently communicated to flow/velocity span block 726. The water balancing technique may be desirable when a high degree of accuracy in flow rate measurement is desired. In still further embodiments, logic within smart actuator device 702 (e.g., flow/velocity feedback controller 736) may provide feedback to flow/velocity span block 726 to adjust the flow rate limits based on historical operating data.

Comparator 730 may compare the flow rate/velocity setpoint 728 output received from flow/velocity span block 726 to measured flow rate/velocity data. Measured flow rate velocity data may be received from flow rate sensor 748 via digital filter 738. Digital filter 738 is configured to convert the measured flow rate/velocity data 742 into a flow rate/velocity feedback signal 714 that may be provided as an input to comparator 720. In some embodiments, digital filter 738 is a first order low pass filter. In other embodiments, digital filter 738 may be a low pass filter of a different order or a different type of filter.

Comparator 730 may be a discrete electronics part or implemented as part of flow/velocity feedback controller 736. In some embodiments, comparator 730 may output a flow rate/velocity error signal 734 to flow/velocity feedback controller 736. For example, if comparator 730 determines that flow rate/velocity setpoint 728 is higher than flow rate/velocity feedback 732, comparator 730 may generate a flow rate/velocity error signal 734 that causes flow/velocity feedback controller 736 to operate valve actuator 740 to increase the flow rate/velocity through valve 746. Conversely, if comparator 730 determines that flow rate/velocity setpoint 728 is lower than flow rate/velocity feedback 732, comparator 730 may generate a flow rate/velocity error signal 734 that causes flow/velocity feedback controller 736 to operate valve actuator 740 to decrease the flow rate/velocity through valve 746.

Flow/velocity feedback controller 736 is configured to receive flow rate/velocity error signal 734 from comparator 730 and to output a command signal to valve actuator 740 to drive the error signal to zero (i.e., to operate valve actuator 740 such that the measured flow rate/velocity 742 is equal to the flow rate/velocity setpoint 728). Similar to zone temperature controller 724, in various embodiments, flow/velocity feedback controller 736 is a pattern recognition adaptive controller (PRAC), a model recognition adaptive controller (MRAC), or another type of tuning or adaptive feedback controller. In other embodiments, flow/velocity feedback controller 736 operates using state machine or proportional-integral-derivative (PID) logic.

Flow/velocity feedback controller 736 may be configured to output an actuator control signal (e.g., a DC signal, an AC signal) to valve actuator 740. In some embodiments, valve actuator 740 is identical or substantially similar to actuator 502 as described with reference to FIG. 5. For example, valve actuator 740 may be a linear actuator (e.g., a linear proportional actuator), a non-linear actuator, a spring return actuator, or a non-spring return actuator. Valve actuator 740 may include a drive device coupled to valve 746 and configured to rotate a shaft of valve 746. In some embodiments, valve 746 is identical or substantially similar to valve 504 as described with reference to FIG. 5. For example, in various embodiments, valve 746 may be a 2-way or 3-way two position electric motorized valve, a ball isolation valve, a floating point control valve, an adjustable flow control device, or a modulating control valve.

Still referring to FIG. 7, cascaded flow rate system is further shown to include a flow rate sensor 748. In some embodiments, flow rate sensor 748 is identical or substantially similar to the flow rate sensor 510 as described with reference to FIG. 5. For example, in various embodiments, flow rate sensor 748 may be a heated thermistor flow sensor or a vortex-shedding flowmeter. Flow rate sensor 748 may be disposed downstream of valve 746 to measure the flow rate and/or velocity of fluid exiting valve 746. In some embodiments, flow rate sensor 748 is configured to have high sensitivity to changes in flow rate or velocity and, at the same time, to reject pressure fluctuations within the system. In further embodiments, cascaded control systems may be configured to reject fluctuations in system characteristics other than pressure. For example, these characteristics may include inlet water temperature, inlet air temperature, and airside mass flow. Once collected, flow rate and/or velocity data 742 from flow rate sensor 748 may be provided to digital filter 738 of smart actuator device 702.

Fluid that passes through valve 746 may flow through water coil 750. In some embodiments, valve 746 is used to modulate an amount of heating or cooling provided to the supply air for building zone 706. In various embodiments, water coil 750 may be used to achieve zone setpoint temperature 716 for the supply air of building zone 706 or to maintain the temperature of supply air for building zone 706 within a setpoint temperature range. The position of valve 746 may affect the amount of heating or cooling provided to supply air via water coil 750 and may correlate with the amount of energy consumed to achieve a desired supply air temperature.

Figure 8:
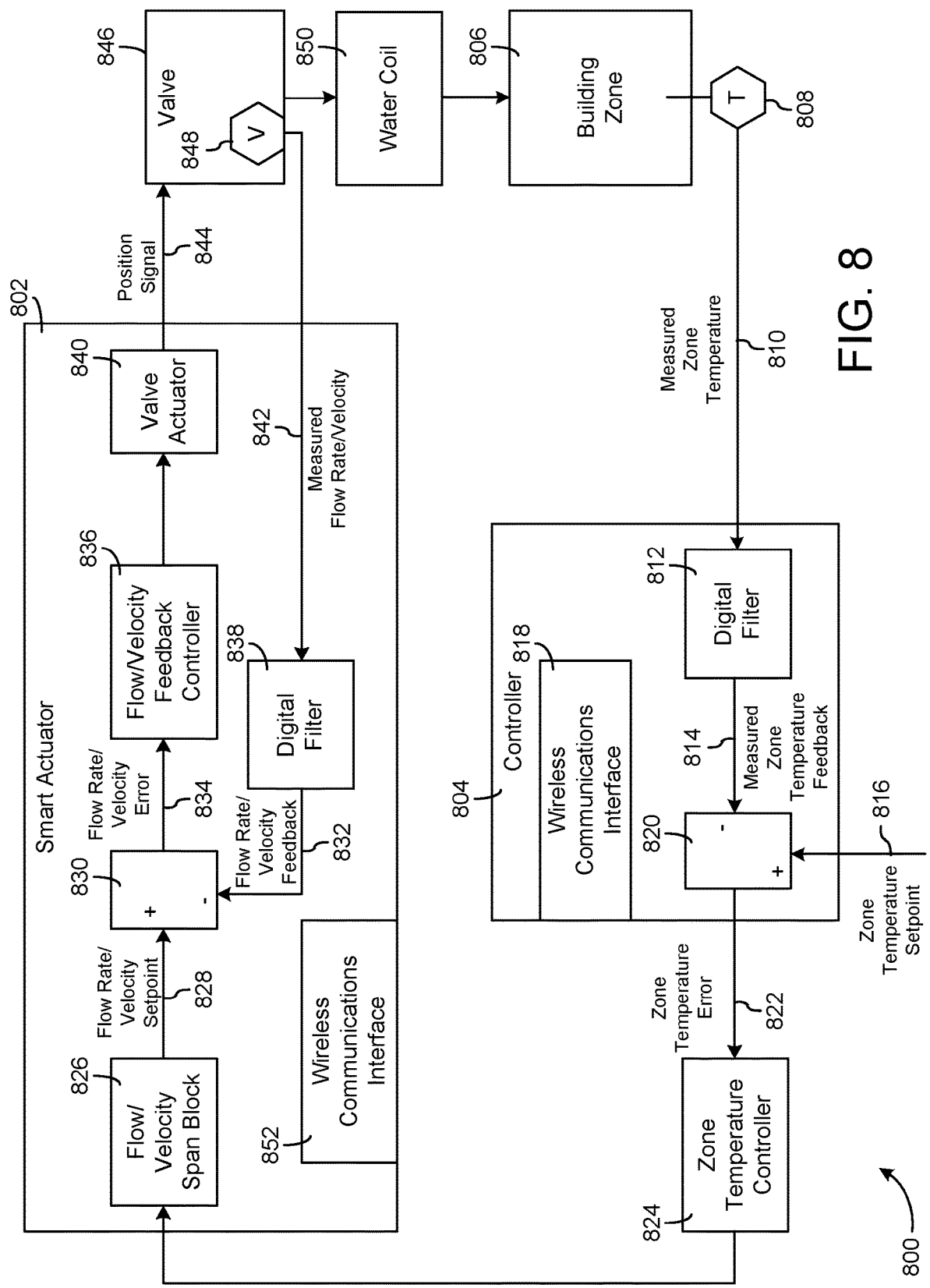
FIG. 8 is a block diagram of another smart actuator valve device within a cascaded control system that can be implemented in the HVAC system of FIG. 1, according to some embodiments.

Turning now to FIG. 8, another block diagram of a smart actuator valve device 802 within a cascaded control system 800 is shown, according to some embodiments. In some embodiments, cascaded control system 800 is a component or subsystem of HVAC system 100, waterside system 200, airside system 300, or BMS 400, as described with reference to FIGS. 1-4. Cascaded control system 800 may be identical or substantially similar to cascaded control system 700 as described with reference to FIG. 7, with the exception that flow sensor 848 (which may be identical or substantially similar to flow sensor 748) is disposed within the device body of valve 846 (as opposed to downstream of the valve, as with valve 746 and flow sensor 748).

Figure 9A:
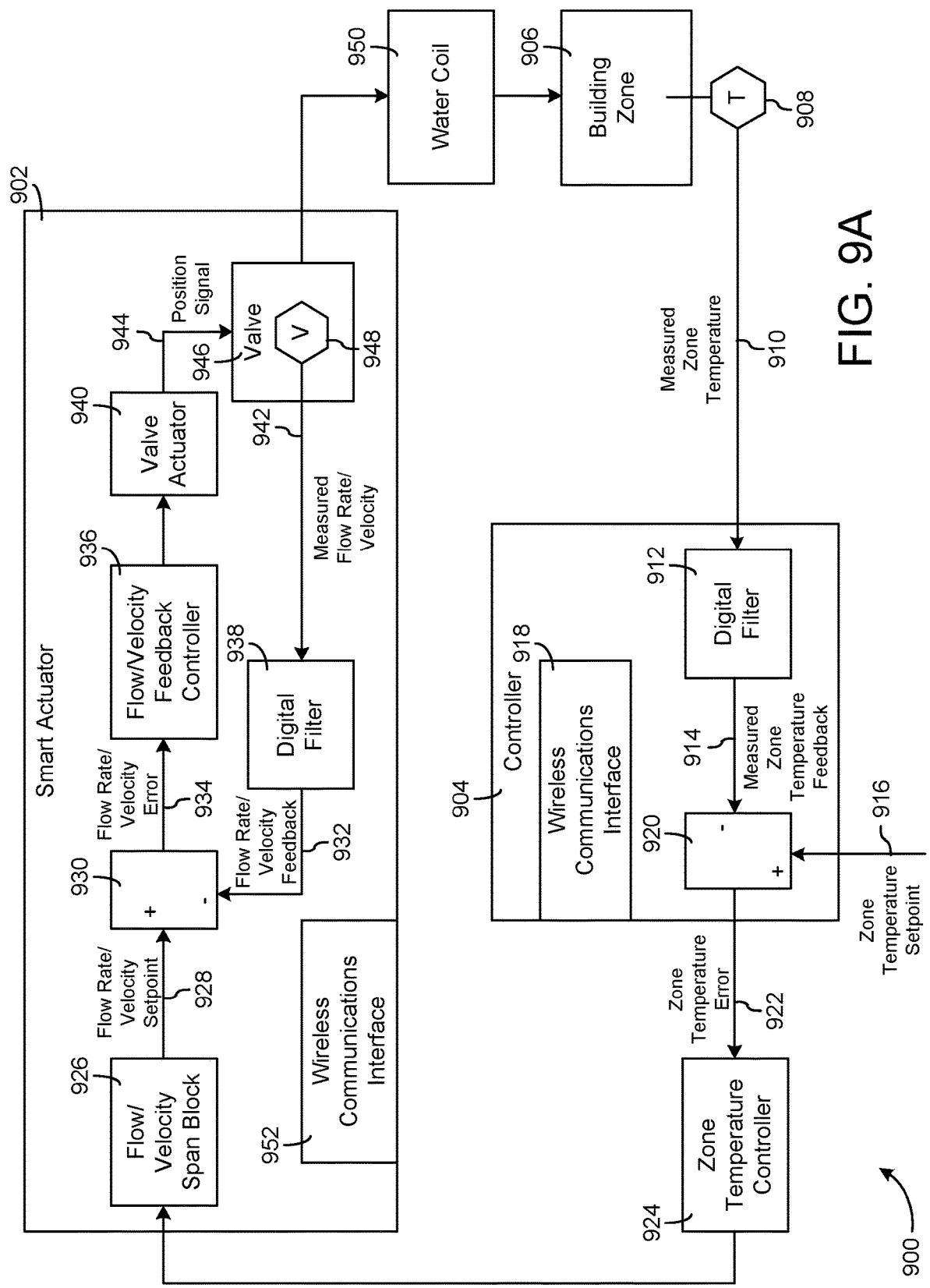
FIG. 9A is a block diagram of another smart actuator valve device within a cascaded control system that can be implemented in the HVAC system of FIG. 1, according to some embodiments.

Referring now to FIGS. 9A-12, block diagrams of smart actuator valve devices within a cascaded control system are shown, according to various embodiments. FIG. 9A depicts a cascaded control system 900 in which flow rate sensor 948 (which may be identical or substantially similar to flow rate sensor 748) is disposed within valve 946. Valve 946 (which may be identical or substantially similar to valve 746) is disposed within smart actuator valve device 902.

Figure 9B:
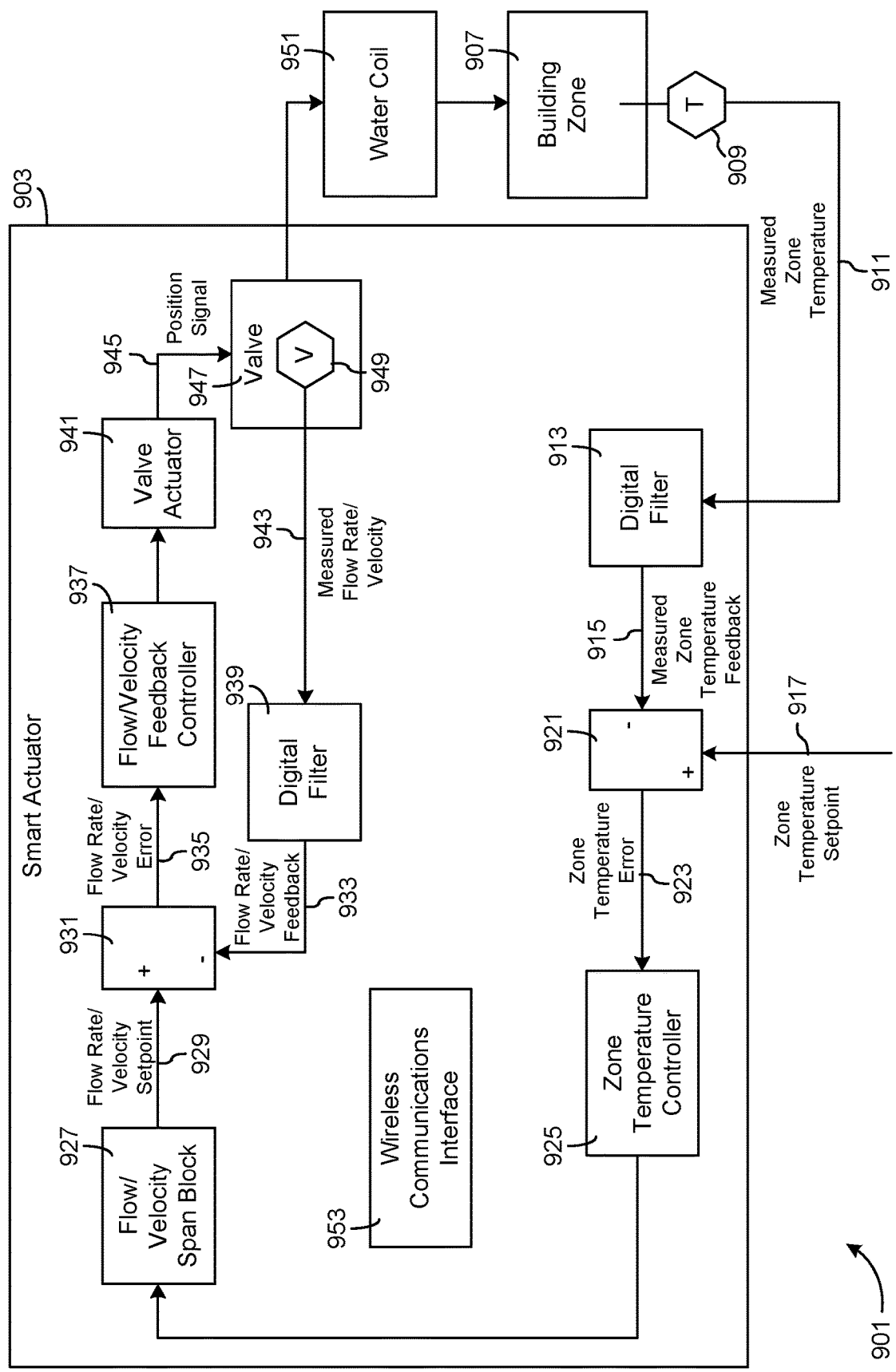
FIG. 9B is a block diagram of another smart actuator valve device within a cascaded control system that can be implemented in the HVAC system of FIG. 1, according to some embodiments.

FIG. 9B depicts a cascaded control system 901 in which flow rate sensor 949 is similarly disposed within valve 947, and valve 947 is disposed within smart actuator valve device 903. However, in contrast to system 900, FIG. 9B depicts a system 901 in which components previously described as located within one or more separate devices (e.g., digital filter 912, comparator 920, zone temperature controller 924 of system 900) are instead located within the common integrated device chassis of smart actuator valve device 903. In short, measured zone temperature 911 and zone temperature setpoint 917 may be provided as direct inputs to smart actuator device 913 without the use of any intermediary devices. The configurations of smart actuator valve devices 902 and 903 as depicted in FIGS. 9A and 9B may prove particularly advantageous because each reduces the number of installed devices necessary to implement a cascaded control system of the type described in FIGS. 7-12.

Figure 10:
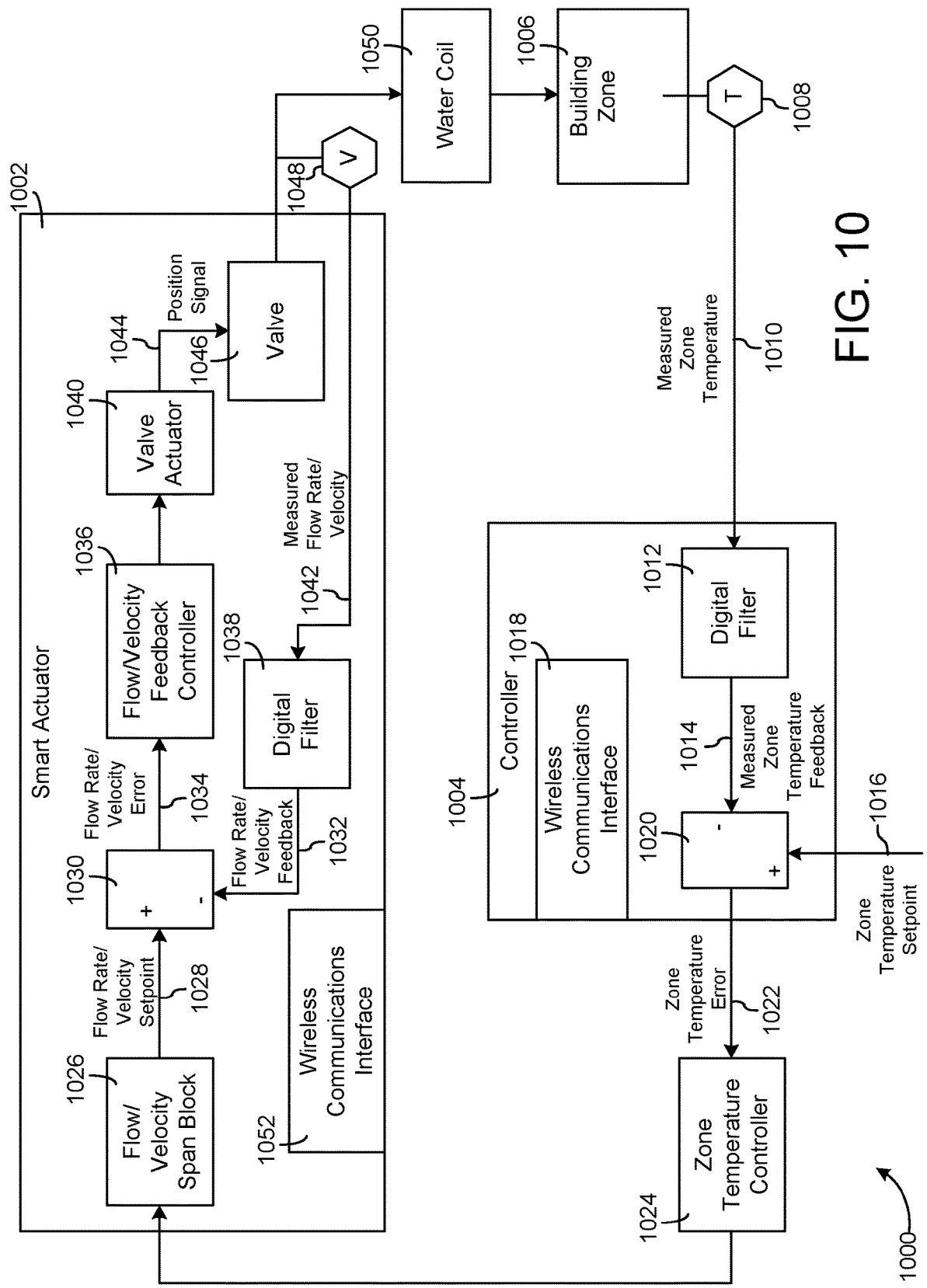
FIG. 10 is a block diagram of another smart actuator valve device within a cascaded control system that can be implemented in the HVAC system of FIG. 1, according to some embodiments.
Figure 11:
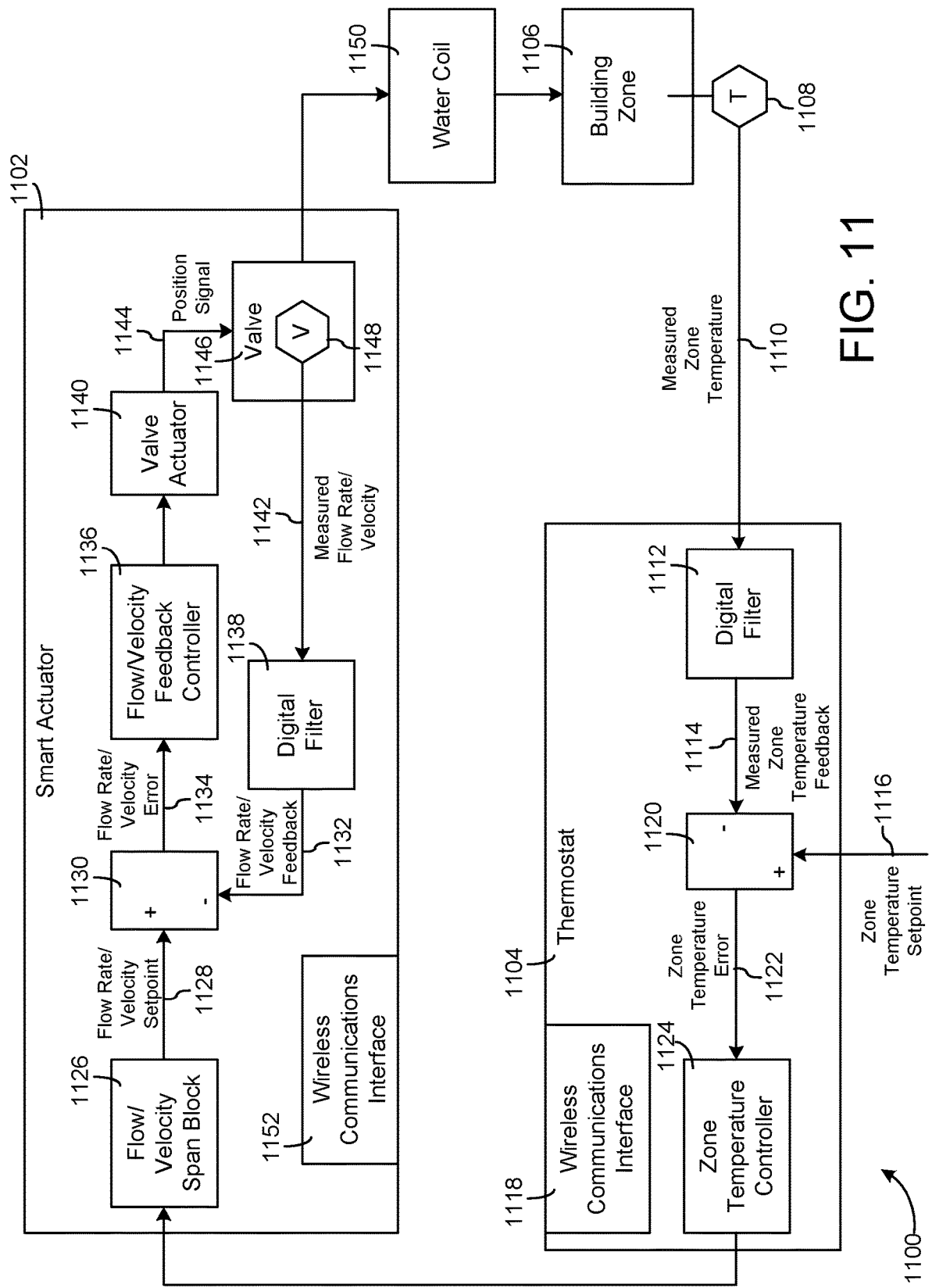
FIG. 11 is a block diagram of another smart actuator valve device within a cascaded control system that can be implemented in the HVAC system of FIG. 1, according to some embodiments.
Figure 12:
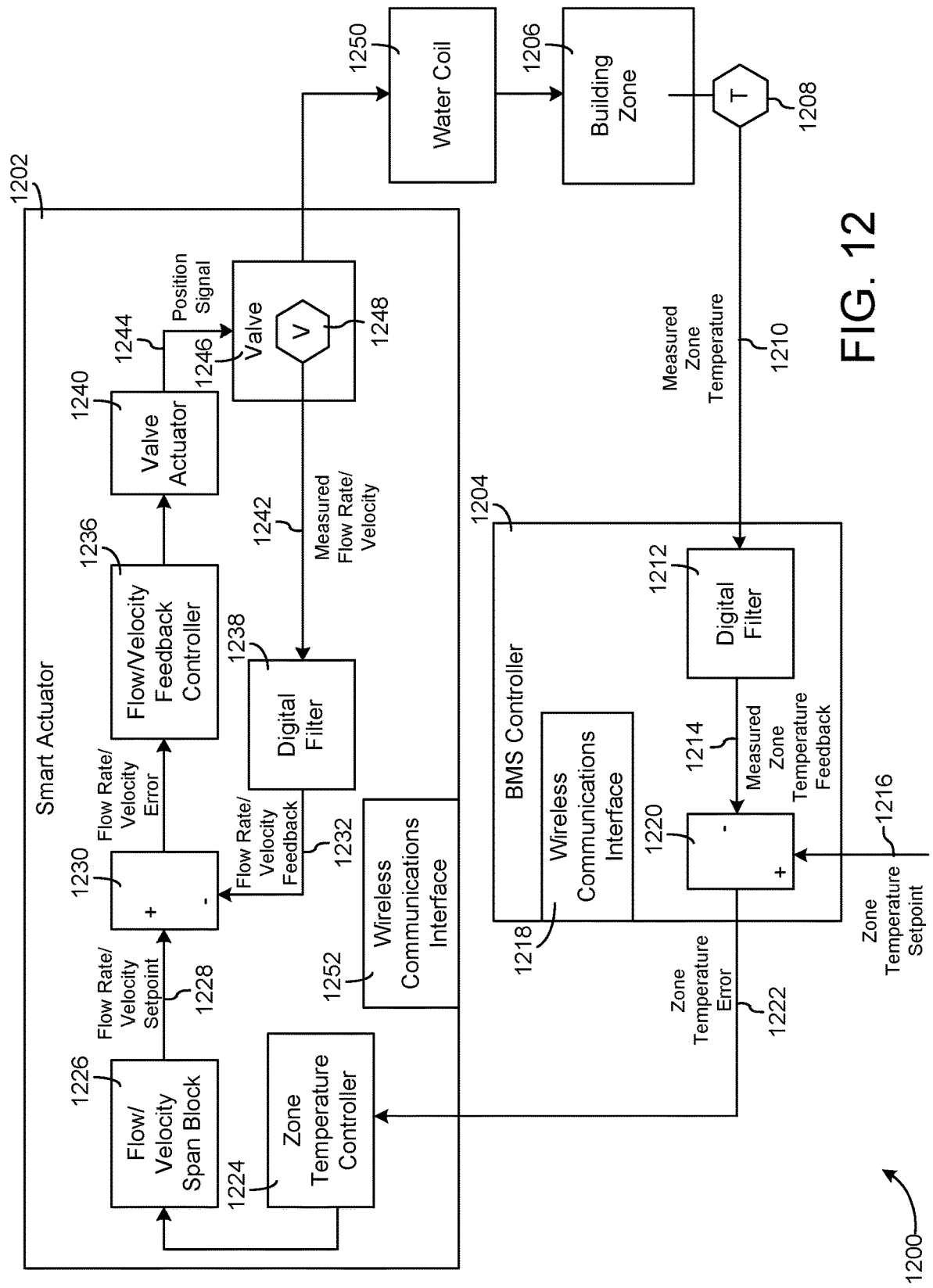
FIG. 12 is a block diagram of another smart actuator valve device within a cascaded control system that can be implemented in the HVAC system of FIG. 1, according to some embodiments.

Turning now to FIG. 10, another embodiment of a cascaded control system depicts a system 1000 in which valve 1046 (which may be identical or substantially similar to valve 746) is disposed within smart actuator valve device 1002. Flow rate sensor 1048 (which may be identical or substantially similar to flow rate sensor 748) is located downstream of valve 1046 and outside of smart actuator valve device 1002. FIG. 11 depicts another embodiment of a cascaded control system 1100. As shown, smart actuator valve device 1102 may be identical or substantially similar to smart actuator valve device 902 (i.e., flow rate sensor 1148 is located within valve 1146, and valve 1146 is located within device 1102). However, cascaded control system 1100 is configured such that zone temp controller 1124 is disposed within thermostat 1104. Finally, FIG. 12 depicts yet another embodiment of a cascaded control system 1200. Similar to system 1100, system 1200 depicts a smart actuator valve device 1202 in which flow rate sensor 1248 is disposed within valve 1246, and valve 1246 is disposed within device 1202. Unlike system 1100, however, zone temperature controller 1224 of system 1200 is located within smart actuator valve device 1202, rather than within BMS controller 1204.

Figure 13:
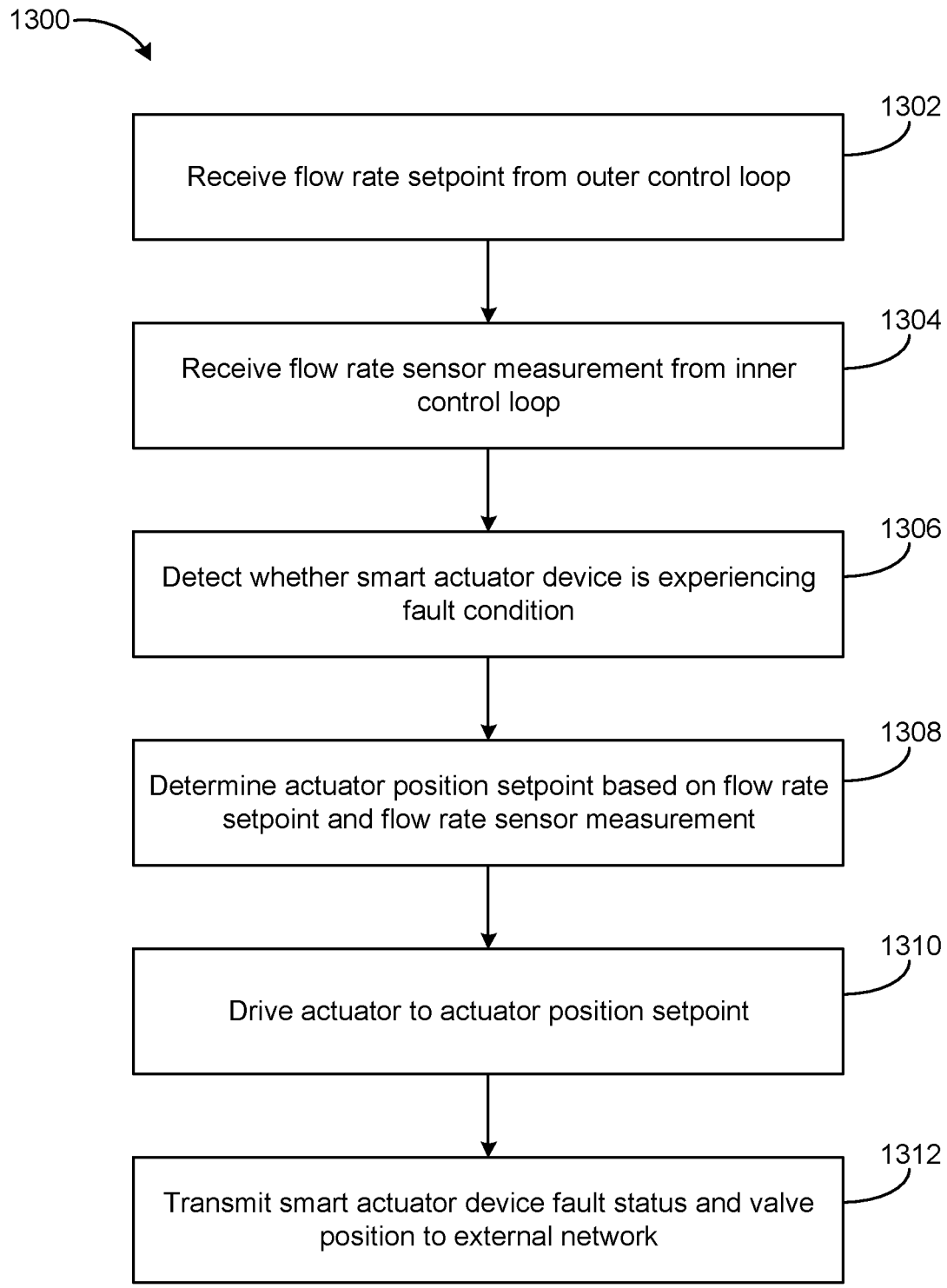
FIG. 13 is a flow diagram of a method of operating a smart actuator valve device within the cascaded control systems of FIGS. 7-12, according to some embodiments.

Referring now to FIG. 13, a flow diagram of a process 1300 for operating a smart actuator valve device within a cascaded control system is shown, according to an exemplary embodiment. Process 1300 may be performed by any or all of cascaded control systems 700, 800, 900, 1000, 1100, and 1200 as described with reference to FIGS. 7-12. For the purposes of simplicity, process 1300 will be specifically described below with reference to cascaded control system 700.

Process 1300 is shown to include smart actuator device 702 receiving a flow rate setpoint 728 from the outer control loop (step 1302). Flow rate setpoint 728 may be generated through a series of steps in the outer control loop. First, comparator 720 of controller 704 may compare a zone temperature setpoint 716 received from a source external to system 700 (e.g., a supervisory controller, a user mobile device) to measured zone temperature feedback 714 from building zone 706. Based on this comparison, comparator 720 may generate a zone temperature error signal 722 that is received by zone temperature controller 724. Zone temperature controller 724 may be configured to generate a flow rate setpoint 728 based on the temperature error signal 722 and transmit flow rate setpoint 728 to smart actuator valve device 702. After verifying that the flow rate setpoint 728 does not exceed a maximum or minimum flow rate limit stored in flow/velocity span block 726, setpoint 728 may be provided as input to comparator 730.

Process 1300 is also shown to include smart actuator device 702 receiving a flow rate sensor measurement 742 from the inner control loop (step 1304). In some embodiments, flow rate sensor data 742 measured via flow rate sensor 748 is first received at smart actuator device 702 by digital filter 738. In various embodiments, digital filter 738 may be a first order low pass filter, a low pass filter of a different order, or a different type of filter. After digital filter 738 converts the measured flow rate/velocity data 742 to a flow rate/velocity feedback signal 732, feedback signal 732 is transmitted to comparator 730.

Continuing with step 1306 of process 1300, flow/velocity feedback controller 736 detects whether smart actuator device 702 is experiencing a fault condition. For example, smart flow/velocity feedback controller 736 may log a fault condition if either valve actuator 740 or valve 746 experiences an electrical or mechanical fault (e.g., signal interruption to valve actuator 740 and/or valve 746, collected debris within valve actuator 740 and/or valve 746). Flow/velocity feedback controller 736 may determine the existence of a fault via the measured flow rate/velocity data 742 and/or flow rate/velocity feedback signal 732. For example, if either flow rate data 742 or flow rate feedback signal 732 indicates that the flow through valve 746 is zero or effectively zero, feedback controller 736 may log a fault condition for smart actuator device 702. Similarly, if flow rate sensor 748 is a heated thermistor-type flow rate sensor and temperature data from the sensor indicates that the temperature of the fluid flowing through valve 746 is unusually high, feedback controller 736 may log a fault condition. In some embodiments, the existence of a fault may be expressed as a binary signal (e.g., 0 for no fault detected, 1 for fault detected).

At step 1308, flow/velocity feedback controller 736 determines an actuator position setpoint based on the flow rate/velocity error signal 734 received from comparator 730. In some embodiments, as described above, the flow rate/velocity error signal 734 is determined by comparator 730 based on a comparison between flow rate/velocity setpoint 728 and flow rate/velocity feedback 732. The actuator position setpoint determined by flow/velocity feedback controller 736 may be expressed in a variety of ways, including number of degrees of rotation of a drive device relative to a fixed position (e.g., a zero location, a mechanical end stop, etc.) a number of revolutions of the motor, a number of Hall sensor counts, etc.

Process 1300 continues with step 1310, in which smart actuator device 702 drives valve actuator 740 to the actuator position setpoint. In some embodiments, flow/velocity feedback controller 736 may transmit an actuator position control signal (e.g., a DC voltage, an AC voltage) to valve actuator 740. As described above with reference to FIG. 7, valve actuator 740 may be coupled to valve 746 via a drive device, and thus a change in the position of valve actuator 740 may effect a change in the position of valve 746. A change in the position of valve 746 results in a corresponding change in flow rate of the fluid passing through valve 746.

Process 1300 concludes with step 1312, in which smart actuator device 702 transmits data regarding the smart actuator device 702 to an external device or network. In some embodiments, this data may include the fault condition status and actuator position setpoint of device 702. For example, if flow/velocity feedback controller 736 logged a fault condition in step 1306, wireless communications interface 752 may transmit a status message indicating the presence of a fault condition at step 1312. Similarly, wireless communications interface 752 may transmit an actuator position message based on the position setpoint determined at step 1308. Transmission of fault status and position data to external devices and/or networks may be useful in directing technicians to devices that require servicing. Transmission of device data may also be necessary or helpful in optimizing a system pressure setpoint value, described in greater detail below.

Smart Actuator Valve Device Applications

The smart actuator valve devices described above with reference to FIGS. 5-13 may be suitable for a variety of applications that represent improvements over existing actuator devices. One application is device identification and recognition. In some embodiments, device identification and recognition functions may be performed by main actuator controller 632 of the integrated smart actuator device 600. Device identification may include identification of the location of the smart actuator device within HVAC system 100. For example, it may be useful to pinpoint the location of the smart actuator device in order for a technician to troubleshoot, service, or replace the device. In various embodiments, smart actuator device location information may be transmitted from the smart actuator device to a supervisory controller or a technician's mobile device.

Device recognition may include determination of the specific types of equipment (e.g., valves, dampers) either coupled to or integrated within the smart actuator device. In some embodiments, device recognition functions are performed by main actuator controller 632 of the integrated smart actuator device 600. For example, the smart actuator may detect properties of the coupled equipment including flow requirements, stroke length, and the performance profile. By recognizing the characteristics of the coupled equipment, the smart actuator device can tailor both the operation of the smart actuator device and the control signals sent the equipment to ensure the equipment is functioning optimally.

As referenced above, another smart actuator valve device application is fault detection and troubleshooting. In addition to identifying the device location for service and replacement purposes, the smart actuator valve device may include functionality permitting the device to detect faults and to shut down the device before permanent damage can occur. For example, as described above with reference to FIGS. 7-12, in some embodiments, the flow sensor detecting flow through the valve is a heated thermistor flow sensor. A heated thermistor flow sensor operates according to the principles of King's Law and provides a temperature measurement of the fluid flowing through the valve. If, for example, the temperature of the fluid is detected to be abnormally high, the smart actuator device may log a fault condition and shut down to prevent the overheating of any sensitive components. As another example, if the flow rate through the valve is detected to be either abnormally high or abnormally low, the smart actuator device controller may perform functions (e.g., operating the actuator over its entire stroke length) to determine whether the fault is occurring within the valve or the actuator itself.

Still another smart actuator valve device application is the automatic balancing of valves. Manual balancing of valves often includes substantial manual effort (e.g., technicians must often disassemble ceiling tiles to access valves) and the process is iterative, requiring many adjustments across many valves before an optimal configuration is achieved. In various embodiments, a valve balancing program may be transmitted from a technician's mobile device, received by communications circuit 612 of the smart actuator device 600, and executed by main actuator controller 632. Automatic valve balancing functionality may be particularly desirable to quickly re-configure an HVAC system when a new tenant of a building desires a different building layout than a prior tenant.

Another smart actuator device application may include the checkout of fire dampers. Fire dampers are passive fire protection devices used in HVAC ducts to prevent the spread of fire inside the ductwork through fire-resistance rated walls and floors. Certain buildings (e.g., hospitals) must perform scheduled checkouts that involve actuation of the dampers to ensure their proper operation. By coupling the fire dampers to smart actuators that are able to receive wireless control signals (e.g., via communications circuit 612 of the smart actuator device 600), an inspector may easily complete the checkout via damper actuation signals transmitted from the inspector's mobile device.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A device in an HVAC system configured to modify an environmental condition of a building, the device comprising:
    a valve configured to regulate a flow of a fluid through a conduit;
    an actuator comprising a motor and a drive device, the drive device driven by the motor and coupled to the valve for driving the valve between multiple positions; and
    a processing circuit coupled to the motor and configured to:
        determine that the valve is coupled to the actuator,
        in response to the determination that the valve is coupled to the actuator, perform a device recognition process to detect device identifying information for at least one of the valve or the actuator, the detected device identifying information comprising a location of the device and a property of the valve or the actuator, and
        operate the motor based at least in part on the location and the property of the valve or the actuator.

2. The device of claim 1, further comprising a communications mechanism coupled to the processing circuit.

3. The device of claim 2, wherein the communications mechanism is configured to transmit the location to an external device.

4. The device of claim 3, wherein the external device is at least one of a supervisory controller and a mobile device.

5. The device of claim 1, wherein the device identifying information comprises a flow requirement.

6. The device of claim 1, wherein the device identifying information comprises a stroke length.

7. The device of claim 1, wherein the device identifying information comprises a performance profile.

8. A device in an HVAC system configured to modify an environmental condition of a building, the device comprising:
    a valve configured to regulate a flow of a fluid through a conduit;
    an actuator comprising a motor and a drive device, the drive device driven by the motor and coupled to the valve for driving the valve between multiple positions; and
    a processing circuit coupled to the motor and configured to:
        determine that the valve is coupled to the actuator,
        in response to the determination that the valve is coupled to the actuator, determine a location of the device and detect at least one of a stroke length or a performance profile for at least one of the valve or the actuator, and
        operate the device based on the location and at least one of the detected stroke length or detected performance profile.

9. A device in an HVAC system configured to modify an environmental condition of a building, the device comprising:
    a valve configured to regulate a flow of a fluid through a conduit;
    an actuator comprising a motor and a drive device, the drive device driven by the motor and coupled to the valve for driving the valve between multiple positions; and
    a processing circuit coupled to the motor and configured to:
        determine that the valve is coupled to the actuator,
        in response to the determination that the valve is coupled to the actuator, determine a location of the device and detect a physical characteristic of the valve, and
        operate the device based on the location and the detected physical characteristic.

10. The device of claim 1, further comprising a chassis or housing;
    wherein the valve, the actuator, and the processing circuit are located within the chassis or housing.

11. The device of claim 1, wherein the processing circuit is further configured to determine at least one end stop location of the actuator.

12. The device of claim 11, further comprising a communications mechanism coupled to the processing circuit;
   wherein the processing circuit is further configured to transmit the at least one end stop location to the communications mechanism; and
   wherein the communications mechanism is configured to transmit the at least one end stop location to an external controller.

13. The device of claim 12, wherein the communications mechanism is further configured to:
   receive at least one received end stop location; and
   transmit the at least one received end stop location to the processing circuit.

14. The device of claim 8, further comprising a chassis or housing;
   wherein the valve, the actuator, and the processing circuit are located within the chassis or housing.

15. The device of claim 8, wherein the processing circuit is further configured to determine at least one end stop location of the actuator.

16. The device of claim 15, further comprising a communications mechanism coupled to the processing circuit;
   wherein the processing circuit is further configured to transmit the at least one end stop location to the communications mechanism; and
   wherein the communications mechanism is configured to transmit the at least one end stop location to an external controller.

17. The device of claim 16, wherein the communications mechanism is further configured to:
   receive at least one received end stop location; and
   transmit the at least one received end stop location to the processing circuit.

18. The device of claim 9, further comprising a chassis or housing;
   wherein the valve, the actuator, and the processing circuit are located within the chassis or housing.

19. The device of claim 9, wherein the processing circuit is further configured to determine at least one end stop location of the actuator.

20. The device of claim 19, further comprising a communications mechanism coupled to the processing circuit;
   wherein the processing circuit is further configured to transmit the at least one end stop location to the communications mechanism; and
   wherein the communications mechanism is configured to transmit the at least one end stop location to an external controller.

21. The device of claim 20, wherein the communications mechanism is further configured to:
   receive at least one received end stop location; and
   transmit the at least one received end stop location to the processing circuit.

* * * * *